Feb. 18, 1969     M. M. SEELOFF     3,428,775
INTERLEAVED SHEAR AND SEAM WELDER
Filed May 9, 1966
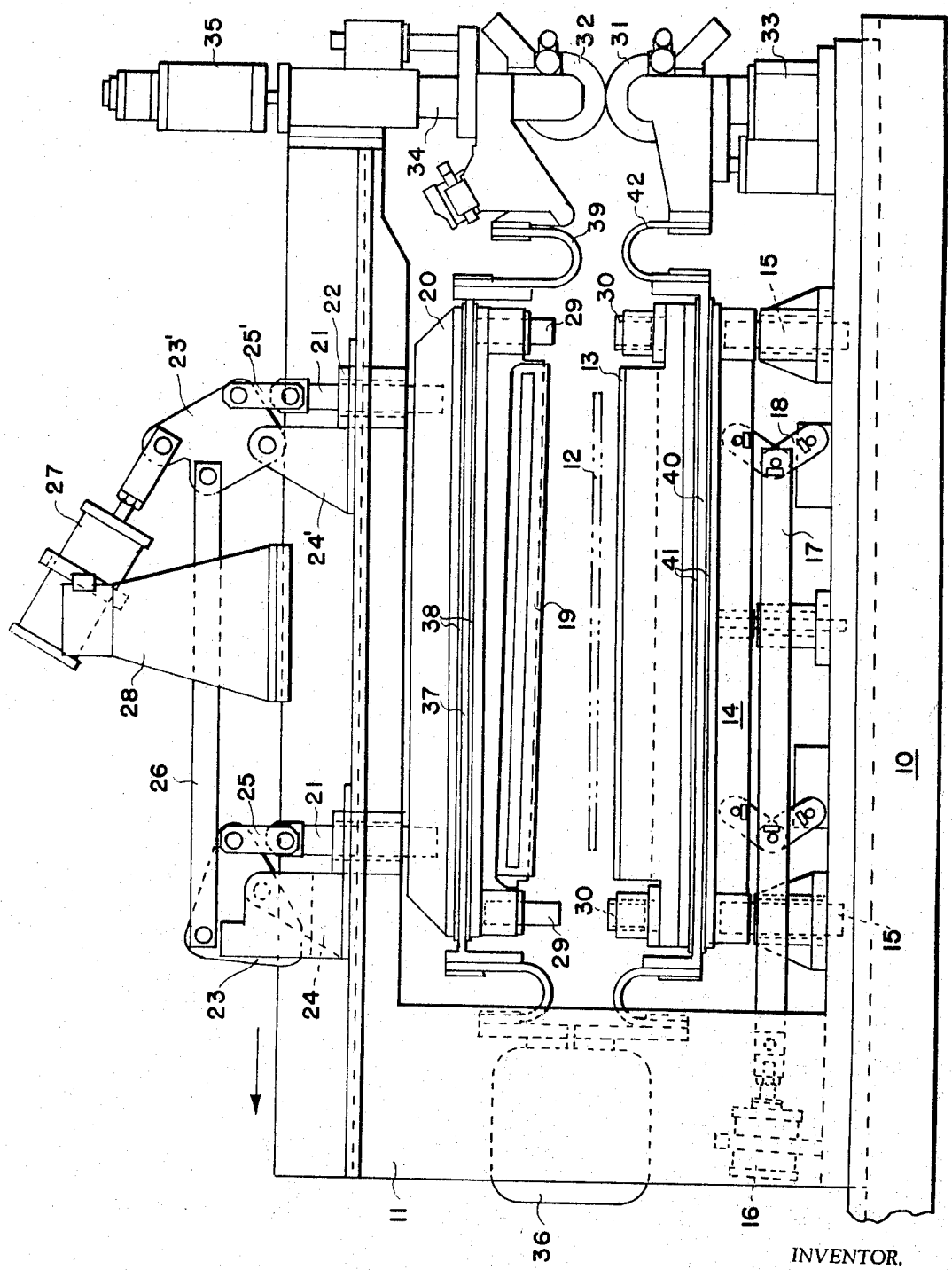
INVENTOR.
MELVIN M. SEELOFF
BY
*Francis J. Klempay*
ATTORNEY

United States Patent Office 3,428,775
Patented Feb. 18, 1969

3,428,775
INTERLEAVED SHEAR AND SEAM WELDER
Melvin M. Seeloff, Warren, Ohio, assignor to The Taylor-Winfield Corporation, Warren, Ohio, a corporation of Ohio
Filed May 9, 1966, Ser. No. 548,543
U.S. Cl. 219—82
Int. Cl. B23k 11/06
7 Claims

ABSTRACT OF THE DISCLOSURE

Apparatus of the type for joining metal strip in end-to-end relationship by overlapped seam welding wherein a shear and a pair of welding wheels are mounted side-by-side in a frame movable transversely of the strip. The improvement comprises incorporation of the current-conductive secondary circuit connectors in the upper and lower shear carriers in insulated relationship therewith in order to provide a very short path in substantially straight line relationship with and between the welding transformer and the welding wheels, both of which are connected by flexible current-conductive bands to the ends of said connectors. Very high welding currents are thus conducted and the assembly is made very compact and relatively inexpensive.

This invention relates to welding apparatus for joining strip in general end-to-end relation, and more particularly to an improved machine for trimming or squaring the adjacent ends of strip lengths and thereafter narrowly overlapping the adjacent ends and seam welding the same together by passing weld wheels on the opposite sides or faces of the overlap. Machines of this general character are well known in the art, one such being shown in U.S. Patent No. 2,957,071 wherein a shear assembly and a seam welding assembly are mounted in an elongated window of a frame which is transversely movable with respect to the clamps which secure the strip lengths to be welded together. It is also common practice in the art to retain the strip lengths in the weld clamps after shearing and during the manipulation of the clamps to effect the overlap desired and thereafter during the welding so that a welded zone of minimum width and dimension may be effected to assist in mashing down the composite thickness of the welded overlap, all as is well known in the prior art. This arrangement, of course, as well as the requirement of providing a fixed path of travel for the strip in the processing or utilization line requires the strip clamp assemblies to be fixed laterally of the path and the laterally or transversely movable frame carrying the shear and welder assemblies to be quite long. The latter is true because the shear must be of sufficient dimension to handle the widest strip encountered, an opening must be provided to accommodate the overlapped strip after shearing and overlapping and before its engagement by the weld wheels, and because the welder itself must have a horizontal throat of sufficient depth to allow a full traverse of the weld wheels over the work.

Heretofore, the practice has been to mount the entire welding assembly in one end portion of the window or opening through the movable frame while the other end portion has been reserved for the shear. The welding assembly requires quite long leads to the wheel electrodes from the secondary pads of the welding transformer to provide the required deep throat above mentioned. When this dimension is added to the dimension of the shear the required window or opening in the movable frame becomes quite long. This necessitates a long frame and much space in the plant facility in a direction transverse of the strip joining and processing or utilization line.

It is the primary object of the present invention to provide a combined strip shearing and welding machine having the desirable characteristics first enumerated above which is much more compact than machines heretofore proposed for similar purposes and which requires much less factory floor space in a direction transverse of the line of strip movement. A further object of the invention is to provide this stated improvement while yet decreasing the cost of the equipment and making it more rugged and durable. A more specific object of the invention is to provide these improvements while yet rendering it possible to reduce the number of parts required in the complete assembly.

The above and other objects and advantages of the invention will become apparent upon consideration of the following specification and the accompanying drawing wherein there is disclosed a preferred embodiment of the invention.

The sole figure of the drawing is an elevation of a combined machine constructed in accordance with the principles of the invention, looking in the direction of strip travel through the apparatus.

In the drawing, reference numeral 10 designates a normally fixed base of the combined shearing and welding machine on which is slideably mounted a heavy C-shaped frame 11. This frame is movable on the base 10 in the direction of the arrow shown and then back to its initial position by a screw or elongated cylinder, both not shown, in a manner well understood by those familiar with machines for shearing and welding strip. Reference numeral 12 indicates the path taken both by strip running through the machine and by a strip length which is about to be joined in general end-to-end relation to a second strip length.

As explained above, narrow overlap seam welds between successive strip lengths are commonly made by first shearing (squaring) the tail end of a preceding strip length after which the head end of a new or succeeding strip length is advanced into the machine and then also sheared or squared. The two adjacent sheared strip ends are then slightly overlapped by manipulation of the two strip clamps, not shown herein but well known in the art, and thereafter and while the strip lengths remain secured in the clamps the frame 11 is moved to advance the welding wheels on opposite sides or faces of the strip overlap. In the drawing, the lower shear knife is indicated at 13, being mounted on a carrier 14 guided on heavy pins 15 extending upwardly from the lower leg of the frame 11 and rigidly secured thereto. A cylinder 16 acting through bar 17 and toggles 18 is provided to raise the carrier 14 and the lower shear blade to operative position to shear the strip—either the tail end of the leading length or the head end of the next succeeding length—the straightened toggles providing sufficient reactance to the heavy shearing forces encountered.

The upper shear knife 19 is mounted on a carrier 20 which is rigidly supported in depending relation from the lower ends of pins 21 which pass through heavy guide bushings 22 mounted in or on the upper leg of the frame 11. A pair of spaced bellcrank levers 23 and 23' are pivoted on brackets 24 and 24', respectively, rigidly mounted on the upper leg of the C-frame 11 and have operative connection with the pins 21 by means of inter-connecting links 25 and 25'. Levers 23 and 23' are interconnected to rock in unison by the bar 26, and a double-acting cylinder 27 pivoted at midpoint on a bracket 28 also rigidly mounted on the C-frame is provided to rock the levers 23 and 23' and move the pins 21 upwardly or downwardly in unison, depending on the direction of energization of the cylinder 27. The upper blade carrier 20 is provided with downwardly extending guide pins 29 which enter into guide bushings 30 on the lower blade carrier 14 before the shearing knives 13 and 19 are closed sufficiently to begin cutting the work. These pins and bushings properly and precisely align the shearing knives immediately prior to and during actual shearing so that sharp cutoffs will be obtained without tearing or excessive burring of the work. It should be noted particularly that since the right pin 29, as viewed from the drawings, withdraws far out of the aligned bushing 30 when the shear is open the frame 11 and all the parts carried thereby can be moved to the left with the strip or strip lengths held in their fixed position or positions in the path 12 of the strip clamps above mentioned.

The shear blades 13 and 19 may be either double-edged, as shown in the above-referenced prior U.S. patent, or single-edged, as preferred.

A resistance seam welding wheel 31 is journaled in a suitable conductive carrier supported on the lower leg of the C-shaped frame 11 by a suitable support 33, and this carrier is electrically connected to a current-conductive flexible band 42 which in turn is connected to the outer end of a current-conductive bar 40, the inner end of which is connected through a similar current-conductive band to one of the secondary terminals or pads of a welding transformer 36. As shown, this transformer is mounted on or in the vertical web of the C-shaped frame 11.

The invention also provides an upper resistance seam welding wheel 32 overlying the wheel 31 and journaled in an upper current-conductive carrier mounted on the lower end of a vertically slideable shaft 34. A double-acting cylinder 35 has operative connection with the shaft 34 to raise and lower the same and to apply resistance welding force therethrough. The upper conductive carrier which mounts the wheel 32 is connected to the outer end of a flexible current-conductive loop or band 39, and this latter conductor is in turn connected to the outer end of an elongated current-conductive bar 37. The inner end of bar 37 is electrically connected to the other secondary terminal or pad of the transformer 36 by a similar flexible band, all as shown in the drawing.

The elongated conductive bars 37 and 40 may be mounted on or in the shear knife carriers 20 and 14, respectively, in any suitable manner. Since flexible current-conductive loops or bands are provided at each end of these bars, the bars may be rigidly fixed with respect to the shear knife carriers, the loops or bands permitting the vertical movement of the bars during closing and opening actuation of the shear even though the transformer secondary pads and the conductive carriers for the weld wheels are fixed or at rest.

In the drawing, the bars 37 and 40 are shown as being sandwiched between separate upper and lower sections of the shear blade carriers 20 and 14, respectively, suitable insulation 38 being provided for the upper bar 37 and insulation 41 for the lower bar 40. Of course, any bolts or other means, not shown herein, used to couple the various sections of the carriers 20 and 14 would be insulated from the bars 39 and 40, all in accord with known practice in the resistance welder art.

Instead of sandwiching the bars 37 and 40 in between sections of the carriers 20 and 14, it is conceivable that adequate results may be obtained by simply lagging these bars onto outer surfaces of the carriers in insulated relation thereto. This, however, may add to the length of the welding current circuit which is usually undesirable in view of the very heavy currents involved. Also, it is within the contemplation of this invention that the bulk of the shear blade carriers themselves may be made of current-conductive material suitable for carrying the heavy welding currents, combined mechanical and electrical connections being made at each end of such conductive carriers to the flexible current conductive loops or bands above referred to.

From the above it will be evident that the invention does not lie in any particular manner of associating or interleaving the required elongated secondary circuit conductors with the shear elements but, rather, that the gist of the invention lies in the general arrangement of utilizing the dimension of the shear which is in a direction transverse of the strip as space also for the accommodation of the long conductors needed to effect the deep seam welding throat in a machine for making overlapped seam welds in strip. The invention enables the essential parts of the combined shearing and welding machine to be grouped much closer together than in similar prior equipment, adding to the ruggedness and stability of the assembly and very substantially reducing the factory floor space required in a direction transverse of the longitudinal axis of the strip path in the plant.

The specifically illustrated and described embodiment of the invention should be considered as illustrative only since many changes may be made therein without departing from the spirit or scope of the invention. Reference should be had to the appended claims in determining the scope of the invention.

I claim:

1. In apparatus for joining strip in general end-to-end relation by the overlap seam welding method wherein a shear and a pair of welding wheels are mounted in side-by-side relation in a frame movable transversely of the strip whereby the adjacent ends of the strip lengths to be joined may be first trimmed then overlapped and welded; the improvement comprising a resistance welding transformer mounted on said frame at one lateral end of the shear, a pair of opposed welding electrode wheels mounted on said frame at the opposite lateral end of said shear, said shear comprising upper and lower blade carriers which mount current-conductive secondary circuit connectors interposed between said transformer and said welding wheels and in substantial alignment therewith and out of the path of the strip extending longitudinally through the apparatus, so as to provide short current-conductive paths.

2. Apparatus according to claim 1 further characterized in that said trimming means comprises a shear having a lower shear blade carrier positioned below said path and an upper shear blade carrier positioned above said path and movable downwardly with respect to said lower carrier, and said connectors comprising rigid elongated conductors, one rigidly mounted on said lower carrier and the other rigidly mounted on the said upper carrier.

3. Apparatus according to claim 2 further including flexible current-conductive bands interconnecting said transformer and the adjacent ends of said conductors, and other current-conductive flexible bands interconnecting the opposite ends of said conductors and said welding wheels.

4. Apparatus according to claim 1 further characterized in that said frame is C-shaped in elevation looking in the longitudinal direction of the strip in said apparatus, said transformer being mounted on the closed end of said frame and said welding wheels being carried by the free end portions of the upper and lower horizontally disposed legs of said frame.

5. Apparatus according to claim 1 further characterized in that said shear includes a lower blade carrier positioned below said path and an upper blade carrier above said path, said carriers including current-conductive portions which are insulated from said frame and which are operative to provide said secondary circuit interconnections between said transformer and said welding wheels.

6. Apparatus according to claim 1 further characterized in that said trimming means comprises a shear having a lower blade carrier positioned below said path and an upper blade carrier positioned above said path, said carriers having relative closing and opening movement to effect shearing cycles while thereafter allowing strip to pass longitudinally between said blades and carriers, said secondary circuit interconnectors being movable with said carriers, and die pins fixed with respect to one of said carriers to enter into guide bushings fixed with respect to the other of said carriers as the shear blades and carriers approach their closed relative positions to effect a cut.

7. Apparatus according to claim 6 further including flexible current-conductive bands interposed between the transformer and the adjacent ends of said secondary circuit interconnectors, and other flexible current-conductive bands interposed between the opposite ends of said secondary circuit interconnectors and said welding wheels.

References Cited

UNITED STATES PATENTS 3,256,419   6/1966   Taylor et al. _____ 219—83

RICHARD M. WOOD, *Primary Examiner.*

B. A. STEIN, *Assistant Examiner.*